(12) United States Patent
Roggeveen et al.

(10) Patent No.: US 11,591,065 B2
(45) Date of Patent: Feb. 28, 2023

(54) NOISE ATTENUATION PANEL

(71) Applicant: Fokker Aerostructures BV, Papendrecht (NL)

(72) Inventors: Marcel Roggeveen, Papendrecht (NL); Remco Gijseman, Papendrecht (NL); Wilson Wong, Papendrecht (NL)

(73) Assignee: Fokker Aerostructures BV, Papendrecht (NL)

( * ) Notice: Subject to any disclaimer, the term of this patent is extended or adjusted under 35 U.S.C. 154(b) by 291 days.

(21) Appl. No.: 16/754,768

(22) PCT Filed: Oct. 11, 2018

(86) PCT No.: PCT/EP2018/077763
§ 371 (c)(1),
(2) Date: Apr. 9, 2020

(87) PCT Pub. No.: WO2019/072980
PCT Pub. Date: Apr. 18, 2019

(65) Prior Publication Data
US 2020/0298953 A1 Sep. 24, 2020

(30) Foreign Application Priority Data
Oct. 11, 2017 (GB) ..................... 1716651

(51) Int. Cl.
| | | |
|---|---|---|
| *B64C 1/40* | (2006.01) | |
| *B64C 3/22* | (2006.01) | |
| *B64C 3/26* | (2006.01) | |
| *B64C 9/18* | (2006.01) | |
| *B64C 21/10* | (2006.01) | |
| *B64C 23/06* | (2006.01) | |
| *B64C 25/00* | (2006.01) | |

(52) U.S. Cl.
CPC .................. *B64C 1/40* (2013.01); *B64C 3/22* (2013.01); *B64C 3/26* (2013.01); *B64C 9/18* (2013.01); *B64C 21/10* (2013.01); *B64C 23/065* (2013.01); *B64C 2025/003* (2013.01); *B64C 2230/14* (2013.01); *B64C 2230/22* (2013.01)

(58) Field of Classification Search
CPC combination set(s) only.
See application file for complete search history.

(56) References Cited

U.S. PATENT DOCUMENTS

| | | |
|---|---|---|
| 5,923,003 A | 7/1999 | Arcas et al. |
| 9,222,229 B1 | 12/2015 | Chang et al. |
| 2009/0078821 A1 | 3/2009 | Chow et al. |
| 2014/0037873 A1 | 2/2014 | Cheung |

(Continued)

FOREIGN PATENT DOCUMENTS

CN 106694884 A 5/2017

OTHER PUBLICATIONS

International Search Report and Written Opinion for PCT/EP2018/077763 dated Jan. 25, 2019 (12 pages).

(Continued)

*Primary Examiner* — Assres H Woldemaryam
(74) *Attorney, Agent, or Firm* — Bejin Bieneman PLC

(57) ABSTRACT

A noise attenuation element can be arranged for connection to an air directing structure such as a wing flap. The element has a non-uniform lattice density across at least a portion of the body of the element.

5 Claims, 8 Drawing Sheets

(56) References Cited

U.S. PATENT DOCUMENTS

| | | |
|---|---|---|
| 2014/0209737 A1 | 7/2014 | Cook et al. |
| 2015/0259060 A1* | 9/2015 | Khorrami ................ B64C 1/40 244/1 N |
| 2016/0194967 A1 | 7/2016 | Xu |
| 2017/0072638 A1* | 3/2017 | Hayes .................... B64C 1/066 |

OTHER PUBLICATIONS

UKIPO Search Report for GB 1716651.3 dated Mar. 19, 2018 (10 pages).

* cited by examiner

Section E-E'

☐ Porous Titanium
▨ Solid Titanium

Section D-D'
(typical)

NOISE ATTENUATION PANEL

CROSS-REFERENCE TO RELATED APPLICATIONS

This application is a national stage of, and claims priority to, Patent Cooperation Treaty Application No. PCT/EP2018/077763, filed on Oct. 11, 2018, which application claims priority to Great Britain Application No. GB1716651.3, filed on Oct. 11, 2017, which applications are hereby incorporated herein by reference in their entireties.

BACKGROUND

In use, aircraft generate large amounts of noise. This noise is generated not only by the engines but also from the way the aircraft interacts with the air flowing around and over the structure. This noise is known in the art as airframe noise and is a result of friction and turbulence caused by the interaction between the aircraft and the surrounding air. This is particularly the case for parts of the aircraft structure that actively interact or control the airflow such as ailerons, flaps and the like.

Noise regulations, particularly around built-up areas such as cities, restrict the number and type of aircraft that are permitted to fly in order to minimise the noise levels that residents must sustain. Various techniques have been used to reduce noise levels including sound absorbing panels in engines and the like to reduce emitted noise. Flight procedures have also been developed to reduce aircraft noise at ground level such as the Continuous Descent Arrival (CDA) which keeps aircraft as high as possible for as long as possible before starting a continuous descent towards the destination airport.

These solutions have allowed for increases in the number of flights from and to airports by reducing noise levels.

In an aircraft, flaps are positioned at the trailing edges of the wings and are used to increase lift when the aircraft is in flight to allow lower landing and take-off speeds. Both at take-off and landing, the flaps are extended from the trailing edges of the wings in a generally downward direction or rearward and downward direction (such as a Fowler Flap). In doing so the edges of the flap are exposed as they extend out of the rear of the wing. These edges are commonly known as flap side edges.

The noise generated due to the exposed flap side edges contributes a significant portion of the high level of noise of the aircraft. This noise can also be heard in the cabin when the flaps are extended. This increase in noise is particularly notable at landing where the proportion of noise generated by the airframe is relatively high when compared to the noise emitted by the engine.

The noise generated as a result of the exposed flap side edge is due to the pressure differential above and below the flap. This results in turbulent vortices being generated which create high noise levels.

Attempts have been made to control the generation of these vortices. For example incorporating perforated regions into the flap at the flap side edge may reduce vortex generation by trapping air inside the flap side edge.

However, incorporating perforations into the flap may cause complications with integrating these regions into flaps due to a reduction in strength and stiffness caused by the perforation.

SUMMARY

The present includes without limitation a noise attenuation panel for use in an aircraft wing or other air directing structure or structure that causes air to be directed by virtue of its function, and a method of manufacturing the same. A noise attenuation panel described herein may be applied to a flap side edge module for an aircraft and the manufacture of such a noise attenuation panel or flap side edge module is also disclosed. It will be recognised from the disclosure herein that other applications are possible where a reduction in audible noise levels is desired.

The present unconventional design for a flap side edge module has an optimised integration with an improved noise attenuation part of the module. This results in the flap side edge module having a greater resistance to damage. Furthermore, due to the modular nature of the noise attenuation part, it can be easily replaced when required without replacing extensive parts of the flap.

Thus provided herein is a greater reduction in noise caused by the flap side edge. This advantageously further reduces the noise output of an aircraft incorporating an invention described herein.

Viewed from a first aspect, a noise attenuation element can be arranged in use for connection to an air directing structure, the noise attenuation element being formed of a body which has lattice structure, wherein the lattice structure has a non-uniform lattice density across at least a portion of the body.

The term lattice structure is intended to refer to a structure which is formed of a plurality of interconnecting metallic or polymeric strips or beams which form the structure and which define voids or spaces therebetween. In effect a 3-dimensional grid-like structure is formed by the matrix of interconnecting strips. The spaces around the matrix are in fluid communication with the edges of the body allowing air to pass freely into and out of the body. Thus, the body is porous to air. Put another way the body has a lower density than a solid part formed of the same material by virtue of the air space within the body.

The present disclosure may not only be applied to air directing structures, such as flaps, but also to structures that cause air to be re-directed or disturbed by virtue of their function. One such example are the landing gear doors.

In a metallic embodiment the lattice may be, for example, titanium or an alloy thereof. In a polymeric embodiment the material may be, for example, Ultem 1010.

Advantageously, the density of the lattice may be adapted such that the body has a non-uniform lattice density. For example, the body may have at least two regions, each region having a different lattice density and wherein the lattice density of a first region is greater than the lattice density of a second region.

This provides at least 3 advantages.

First, the body can be optimised for strength and or stiffness, for example around the perimeter or around couplings by increasing the lattice density and therefore its strength;

Second, the body can be optimised for weight since regions which are not load bearing during use (or which are loaded less) can benefit from a lower lattice density. This reduces the weight of the component; and Thirdly, the body can be optimised for noise attenuation by adapting the lattice structure to optimise the way air can penetrate the structure at predetermined points. For example, a specific region which is prone to vortex generation may be provided with a localised reduction in lattice density. Specifically, it is possible to make the structure less dense or more dense by, for example, adjusting either (i) the diameter of the individual beams, or (ii) the length of the beams.

By introducing a lattice structure into the flap side edge module it reduces the pressure difference between the upper and lower surface of the wing flap. The pressure difference also fluctuates in a chord-wise direction from leading edge to trailing edge. By tailoring the lattice density according to the local pressure difference an optimal noise reduction may be obtained.

Furthermore, a transition region may be provided between regions of the body with different lattice densities. For example, the lattice density of the body in the transition region may increase from a first lattice density to a second lattice density. In effect three zones may for example be provided—a solid matrix zone, a zone with a predetermined density and a transition zone between the two. More specifically, a first lattice density may be provided which corresponds to the lattice density of a first region of the body and a second lattice density may be provided which corresponds to the lattice density of a second region of the body. The lattice density may then increase uniformly and smoothly between the first and second lattice densities. Alternatively, the lattice density may increase according to any suitable model—for example in a series of steps, exponentially or in some other relationship depending on the strength and or stiffness requirements of the body.

The body may be conveniently adapted so that it can be selectively coupled and decoupled from a structure (such as a wing or flap) by means of a suitable coupling. For example, the element may further comprise couplings arranged in use to allow the element to be coupled to a structure and wherein the lattice density of the body adjacent to the coupling is greater than the lattice density remote from the coupling.

Thus, the strength and or stiffness required at the coupling may be provided by increasing the lattice density at and around the coupling. For example the lattice density may be increased to the extent that the body is solid at the position of the coupling within the body with a tapered lattice density around the coupling. If the coupling is circular the density may be increased at the perimeter of the coupling to create a shaft through which a bolt for example may pass.

The body of the element may in one embodiment have a leading edge in a gas stream direction and a trailing edge in a gas stream direction and wherein the leading edge and trailing edges of the body are solid and the region of the body between the leading and trailing edge has an internal lattice structure. Thus, an aerodynamic body may be provided with a rigid and solid leading and trailing edge and region there between which can benefit from adaptable density.

Furthermore, a transition region as described above may be provided in the body between the solid leading edge and/or solid trailing edge and the region of the body with an internal lattice structure and wherein the transition region has a decreasing or increasing lattice density across the transition region. As described above the transition region allows the lattice density to increase or decrease between a solid portion and a body portion of the element.

The body may be formed of any suitable material such as an aluminium or titanium or alloys thereof, or a polymer.

The definition of the lattice may be between 10 and 50 pores per inch (4 and 20 pores per cm), with a material-volume ratio between 3% and 40%.

The lattice may be formed of Ti-Al6V4 material and have a density between 0.13 kg/dm3 and 1.77 kg/dm3.

The noise attenuation element may be a module arranged in use to be coupled to the edge of a flap of an aircraft wing. Thus, the edge of a flap may benefit from the noise attenuation advantages described herein.

Viewed from another aspect there is provided a flap side edge module configured in use for attachment to a wing flap, the module comprising a leading edge, a trailing edge and a body portion located there-between, the body portion comprising an lattice structure, wherein the body portion is connected to the leading edge and the trailing edge by means of a transition region, wherein the transition region has an lattice structure density gradient such that a lattice density varies between the region proximate to a leading edge or trailing edge to a lower lattice density at a portion of the transition region proximate to the body portion.

As described above in effect multiple zones may be provided—a solid zone at the leading or trailing edge, a body zone in which the lattice structure is largely uniform and a pair of transition zones in which the lattice density increases (or decreases) between the adjacent zones.

The flap side edge module may have a lattice structure extending throughout the body portion. Alternatively the lattice structure may be arranged around the periphery of the body to define a hollow centre or core to all or part of the body.

The flap side edge module may be provided with a number of alternative couplings to connect the module to the flap edge. Here, the flap side edge module may comprise an attachment portion which in use aligns with a distal end of a flap. This may comprise a transition region having a greater lattice density than a portion of the module remote from said attachment portion. Specifically, the transition region may have a lattice density gradient such that a lattice density varies between a first lattice density proximate to the body portion to a greater lattice density at an attachment portion.

The lattice structure may be any suitable distribution of interconnected strips or beams. For example, the lattice structure may be in the form of a non-uniform formation or alternatively a uniform formation or distribution. In another alternative the distribution could be random within the lattice structure.

In yet another alternative the lattice structure may comprise a structure similar to that of a foam, such as a metallic foam. A metallic foam structure could, for example, be formed using an additive manufacture technique. In such an arrangement the structure of the foam may replace the beams/connecting rods described herein for one embodiment.

In one arrangement the lattice structure may comprise a triangular mesh, wherein each edge of each triangle has a length of between 0.7 mm to 1 mm and a width of between 0.08 mm and 0.12 mm. Advantageously the lattice structure may comprise a triangular mesh, and wherein each edge of each triangle has a length of approximately 0.9 mm and a width of approximately 0.1 mm.

The flap side edge module may also comprise at least one coupling configured in use to attach the module to an edge of a flap. One of the couplings may be formed in the leading edge and/or the trailing edge to provide a secure coupling at either end of the module. Similarly at least one coupling may be formed in the body portion to provide a central support for the module.

Where a coupling extends through the lattice structure i.e. within the body, the coupling may comprise a shaft extending through the body portion and arranged in use to receive an attachment member extending through the body portion. This may be an elongate bolt for example or other suitable fixing which may connect to a portion of the wing flap against which the module is positioned.

In such an arrangement the shaft may comprise a first layer and a second surrounding layer, wherein each of the first layer and the second layer extends around the perimeter of the shaft, and wherein the first layer has a higher lattice density than the second surrounding layer. The shaft may further comprise a transition layer between the first layer and second surrounding layer, in which the lattice density reduces towards the surrounding second layer across the transition layer.

Viewed from another aspect there is provided a noise attenuation panel comprising;
 a first portion comprising a porous metallic mesh defining a plurality of air passages through the mesh;
 a second substantially solid portion; and
 a transition portion located between the first and second portions, wherein the density of the mesh reduces from a region proximate to the solid portion to a region proximate to the porous metallic mesh portion.

The lattice structure of the body may be formed using one of a number of additive manufacturing processes. This term is intended to cover manufacturing where the body is formed by selectively adding material to form the 3 dimensional body shape (usually in a layer-by-layer process).

These processes lend themselves particularly well to creating an internal lattice structure as described herein. More specifically, the additive manufacturing processes allow the structure to be 'built' with accuracy and with high tolerances allowing a complex and pre-determined structure to be formed or 'printed' in a suitable metal.

Suitable processes include:
METALS:
Powder bed fusion methods
Direct metal laser sintering (DMLS)
Electron beam melting (EBM)
Selective laser melting (SLM)
Selective laser sintering (SLS)
Direct metal wire deposition
Direct metal powder deposition
POLYMERS:
Fused deposition modelling (FDM)

Thus, viewed from yet another aspect there is provided a method of manufacturing a noise attenuation element, the element arranged in use for connection to an air directing structure, the noise attenuation element comprising a body which has a lattice structure, wherein the lattice structure has a non-uniform lattice density across at least a portion of the body;
 the method comprising the steps of
 forming by additive manufacture a body comprising a lattice structure wherein the lattice structure has a non-uniform lattice density and wherein a transition zone is provided between regions of different density in which the density progressively changes.

Viewed from another aspect there is provided a method of manufacturing a noise attenuation element for a wing flap of an aircraft, the method comprising the steps of:
 (A) Determining the expected in flight loads on the flap and the desired stiffness;
 (B) Calculating a required lattice distribution for a body based on the determinations; and
 (C) Additively manufacturing a body comprising a lattice structure based on the predetermined flight loads and desired stiffness such that the body comprises a non-uniform lattice density.

Viewed from yet another aspect, there is provided an acoustic attenuation panel for an aircraft, the panel comprising a periphery defining an outer boundary of the panel and a region within the periphery comprising a metallic lattice structure, the panel comprising a lattice density transition portion between the boundary and the region within the boundary of the panel, wherein the lattice density increases towards the boundary of the panel. The advantages described herein can be summarised to the following non-exhaustive list:
 Reduced noise levels (mesh or lattice)
 Interchangeable module (couplings)
 Low maintenance/operational cost
 Low life cycle cost
 Resistance to damage (solid trailing edge/leading edge, transition region)
 Reduced flap repair cost because only replace flap side edge module not entire flap—edge of flap is what gets damaged the most
 Mesh or Lattice hole size in body portion provides optimum acoustic performance
 Random mesh or lattice provides same density throughout—if uniform then can look straight through—random mesh means it gets trapped in different dimensions
 A single flap side edge module rather than a module comprising multiple parts and coupling methods.

BRIEF DESCRIPTION OF THE DRAWINGS

The present teachings will now be described, by way of example only, with reference to the following figures in which like parts are depicted by like reference numerals.

Figure 1:
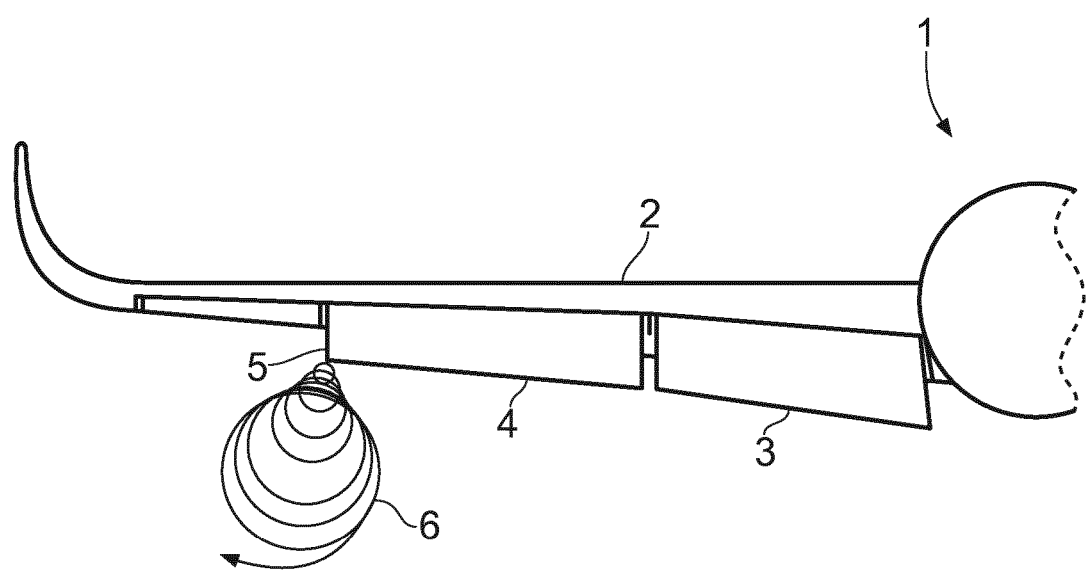
FIG. 1 shows a vortex generation scenario for an aircraft wing.

While the present teachings are susceptible to various modifications and alternative forms, specific embodiments are shown by way of example in the drawings and are herein described in detail. It should be understood, however, that drawings and detailed description thereto are not intended to limit the scope to the particular form disclosed, but on the contrary, the scope is to cover all modifications, equivalents and alternatives falling within the spirit and scope defined by the appended claims.

As used in this specification, the words "comprises", "comprising", and similar words, are not to be interpreted in an exclusive or exhaustive sense. In other words, they are intended to mean "including, but not limited to".

It will be recognised that the features of the aspects of the invention(s) described herein can conveniently and interchangeably be used in any suitable combination. It will also be recognised that the present disclosure covers not only individual embodiments but also combinations of the embodiments that have been discussed herein.

The work leading to this invention has received funding from the European Union Seventh Framework Programme (FP7/2007-2013) under grant agreement n° 604013.

DETAILED DESCRIPTION

The present teaching relates generally to a noise attenuation element or component and a method for manufacturing such a noise attenuation element.

An embodiment will be described in which the element is applied to a wing flap edge structure where noise attenuation can be realised. Furthermore, the wing flap edge can also be optimised for strength, stiffness, durability and connectability as well as acoustic performance. It will be recognised that the present disclosure may also be used in other applications as discussed herein.

According to the present teaching, a flap side edge module is provided which is suitable for connecting to a flap on the wing of an aeroplane. The flap side edge module of the present disclosure reduces airframe noise caused by the edges of flaps when they are in extended form such that their edges are exposed at lift off and landing.

Referring to FIG. 1, one half of a passenger aircraft 1 is shown. The aircraft comprises a wing 2 and a pair of flaps 3, 4. The flaps shown are in an extended state; a state most frequently used on landing and take-off to generate more lift for a given airspeed.

When the flaps are extended the outer flap edge 5 is exposed and interacts with the airflow passing under and over the wing. The flow of air over the edge of the flap creates a vortex 6 as shown in FIG. 1. This vortex is undesirable since it is a source of unwanted aircraft noise.

Figure 2:
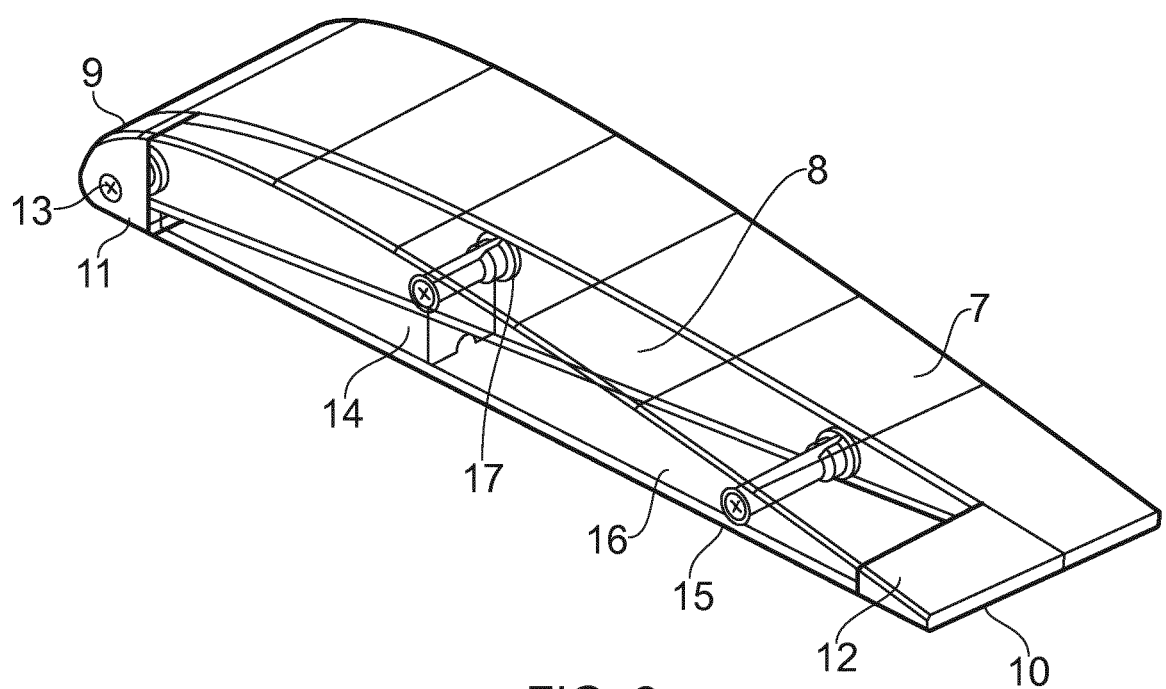
FIG. 2 shows a perspective view of an aircraft wing flap side edge module connected to a flap.

FIG. 2 shows the edge of a wing flap and a flap side edge module extending from the end or edge of the flap. The module is shown in see-through form in FIG. 2 to illustrate the internal components which will be described below.

A flap side edge module has a body 8, a leading edge 9, and a trailing edge 10 which align with the corresponding leading and trailing edges of the flap 7. The flap has an upper surface and a lower surface, wherein the upper surface and lower surface extend between the leading edge and the trailing edge. When attached to the flap of the aircraft, the upper surface faces substantially upwards and the lower surface faces substantially downwards.

As shown in FIG. 2 the module has a leading edge portion 11 which is substantially solid in form i.e. it is formed of a solid material. Similarly the module has a trailing edge portion 12 which also has a substantially solid construction. Example materials which may be used are aluminium, titanium or alloys thereof which may be conveniently processed as described further below.

FIG. 2 also illustrates a plurality of couplings which are used to selectively couple and de-couple the module from the flap. FIG. 2 shows 3 couplings, a first coupling 13 extending through the leading edge portion 11 and a pair of second and third couplings 14, 15 extending through the interior 16 of module body 8.

Any suitable coupling may be used but the couplings shown in FIG. 2 are in the form of elongate bolts which extend through holes or shafts formed in the body 8. The shafts each terminate at the side 17 of the module which aligns with the end of the wing flap. The shafts and couplings are described in further detail below.

The module may or may not be a structural part of the flap i.e. it merely functions as a noise attenuation device at the end of the flap. Alternatively, the module may be integrated into the flap to also function as a structural part and to generate lift for example or direction air in the same way the remainder of the flap directs air.

Figure 3:
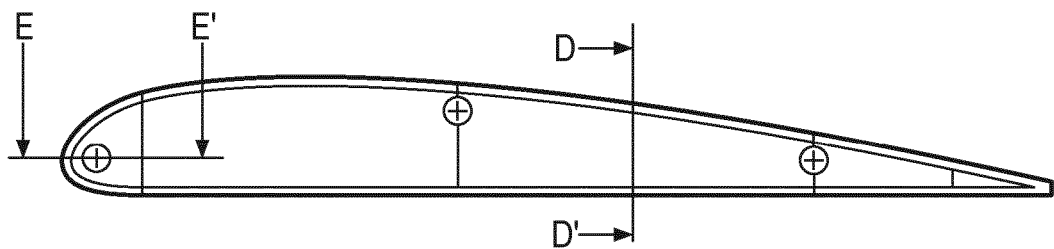
FIG. 3 shows an end view of the flap side edge module.

FIG. 3 shows an end view of the wing flap module showing the aerodynamic profile and couplings at the leading edge and within the body. Sections E-E' and D-D' are described below.

Figure 4:
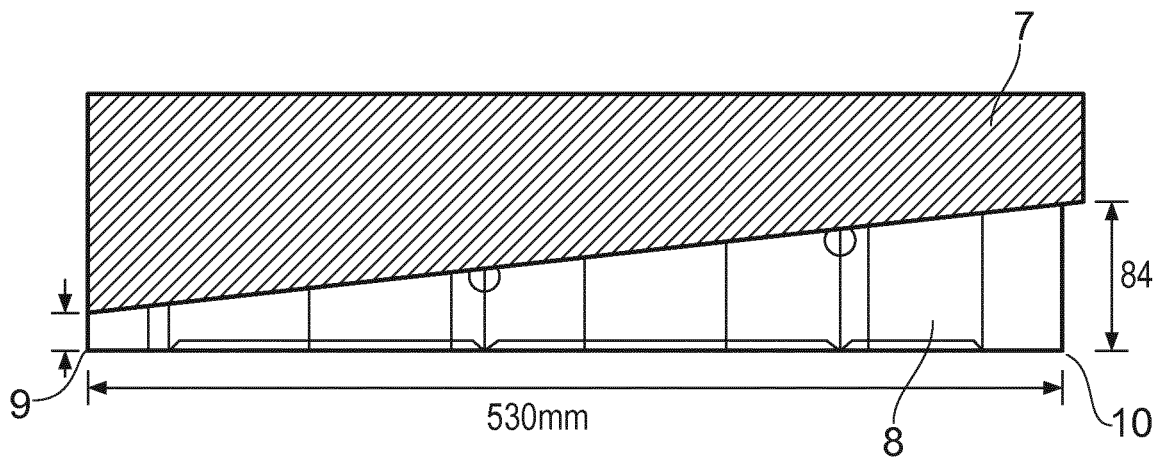
FIG. 4 is a plan view of the flap side edge module and wing flap.
Figure 5:
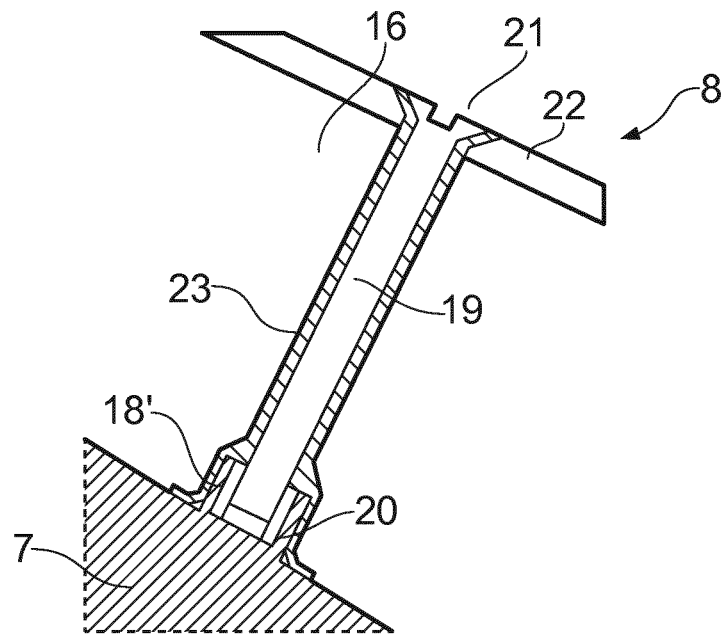
FIG. 5 is a cross-section through E-E' in FIG. 3.

FIG. 4 is a plan view of the module and wing flap. FIG. 4 illustrates the tapered profile of the module from the leading edge 9 to trailing edge 10. As shown by the arrows the width (along the flap span-wise direction) is smaller at the leading edge than the trailing edge. The purpose for this is to compensate for the change in pressure differential from leading edge to trailing edge. The footprint of the pressure difference at the leading edge is smaller than the footprint of the pressure differential at the trailing edge FIG. 5 is a cross-section through section E-E' in FIG. 3. A shown the module body 8 is in abutment with the flap 7. The flap 7 comprises a stud 18 which is arranged to receive a bolt 19 which extends through the interior 16 of the module body 8. A bush 20 is provided for connection to the bolt which allows for ease of replacement/repair.

As shown the bolt is elongate and has a distal end 21 which engages with the outer surface 22 of the module body 8. The bolt 19 is located inside a shaft 18 which is formed of a substantially solid outer wall (in one example a titanium shaft). The shaft receives the elongate bolt which allows the module body 8 to be coupled and de-coupled to the flap 7.

Figure 6:
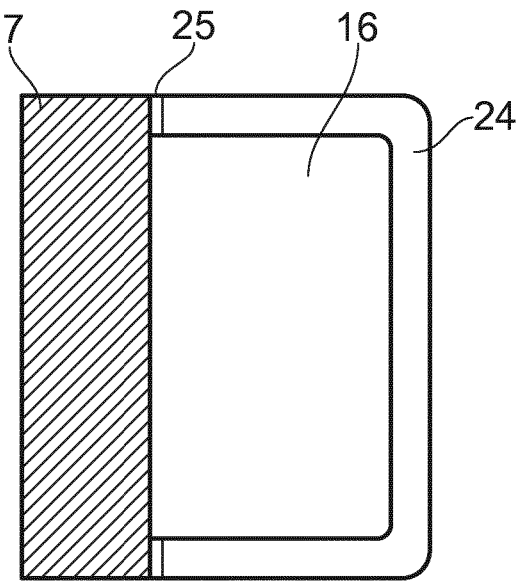
FIG. 6 is a cross-section through D-D' in FIG. 3.

FIG. 6 shows a cross-section through section D-D' from FIG. 3. Here the outer periphery 24 of the module body 8 is shown in abutment with the flap 7. The periphery is formed of a lattice structure (described further below) which has a different density to a solid formed of the same material and specifically a lower density.

A transition region 25, again described further below, is a region in which the material density changes from a first density to a second density by changing the density of the lattice structure. As shown in FIG. 6 the outer periphery 24 defines a hollow interior space 16 within the module.

The internal lattice or mesh structure will now be described.

A feature of the present disclosure is a lattice structure which allows the porosity and density of the body of the module to be controlled and adapted. Intricate internal lattice structures can be formed in a metallic form using additive manufacturing techniques i.e. techniques where shapes are progressively built up layer by layer. Conveniently metal powders such as aluminium and titanium can be used to build complex geometrical shapes and structures. More specifically complex internal lattice like structures may be formed.

Figure 7:
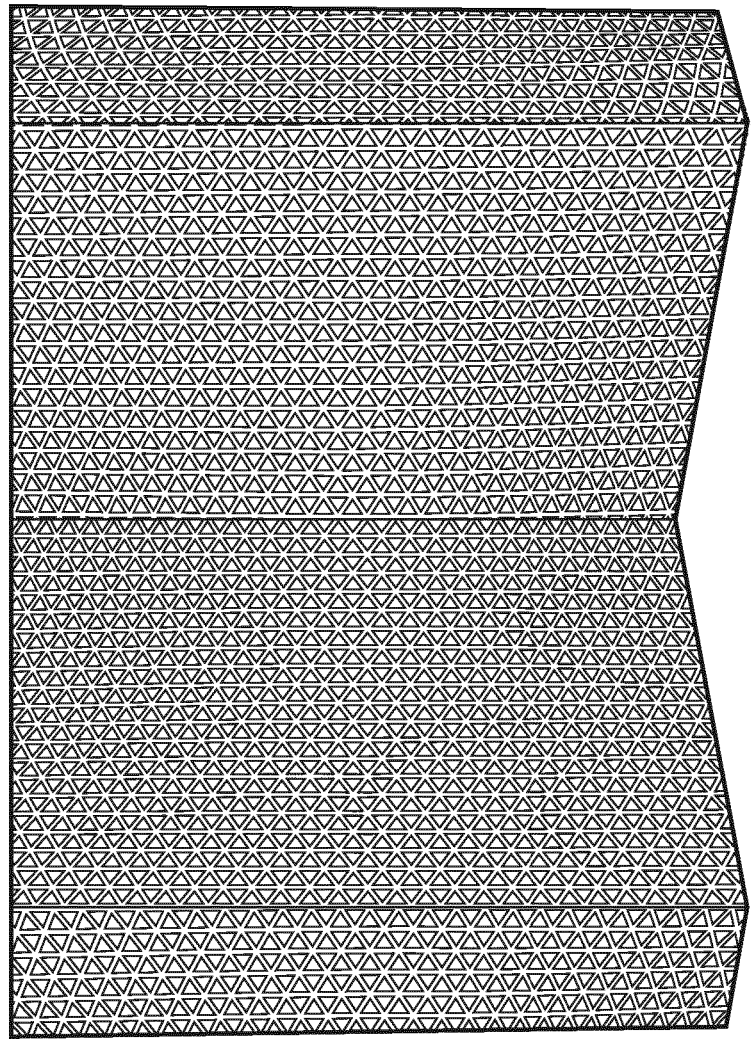
FIG. 7 shows an example lattice structure.

FIG. 7 shows such a lattice or matrix structure in which a network of intersecting strips or beams of metal can be seen in a generally repeating pattern. Any suitable pattern may be used depending on the desired porosity (that is the spaces between the structural members of the lattice) and the desired strength and rigidity. As can be seen in FIG. 7 the structure defines open spaces which provides the porosity (and which reduces density) and which allows air to flow freely into and out of the structure.

The pattern may be any suitable pattern. Once the geometry is determined this can be programmed into the additive manufacturing equipment and the body can be formed.

According to the present disclosure this porous structure advantageously suppresses the vortex generation from an outer surface of a module being formed with this porosity.

By introducing a lattice structure into the flap side edge module it reduces the pressure difference between the upper and lower surface of the wing flap. The pressure difference also fluctuates in a chord-wise direction from leading edge to trailing edge. By tailoring the lattice density according to the local pressure difference an optimal noise reduction is obtained.

Figure 8:
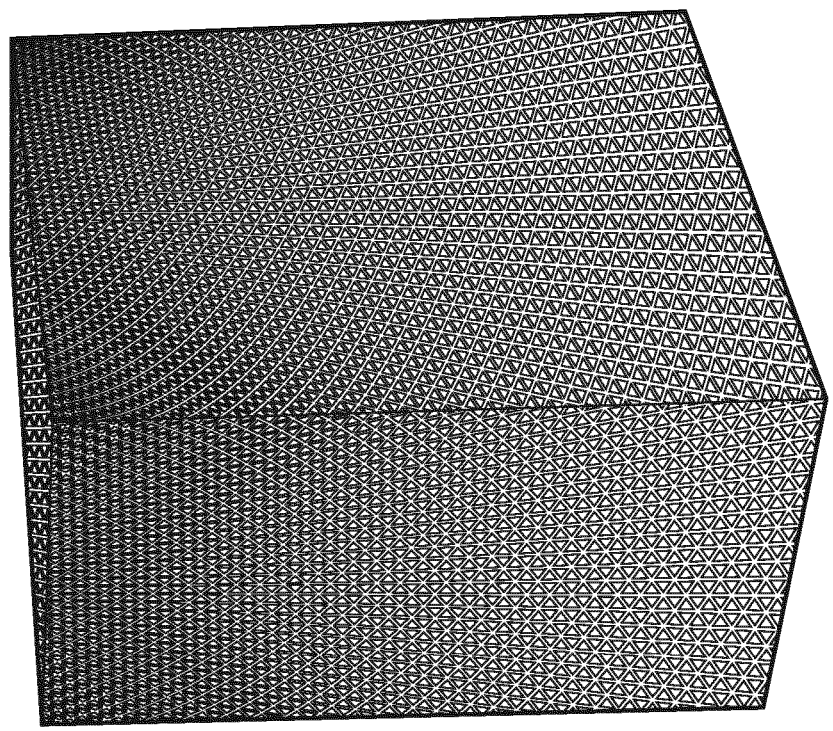
FIG. 8 shows a transition region lattice structure.

A further aspect of an present disclosure described herein is the transition zone or region which extends between regions of different lattice density. This is illustrated in FIG. 8 where a first zone on the left has a higher lattice density than the zone on the right. Adapting the lattice density in this way allows the body strength and or stiffness to be optimised for the particular part of the module as well as allowing the porosity to be increased at areas where high strength and or stiffness is not needed. This allows for acoustic optimisation. It will be recognised from FIG. 8 that the left hand zone allows the body to be coupled structurally to the leading edge or trailing edge with greater strength.

Figure 9:
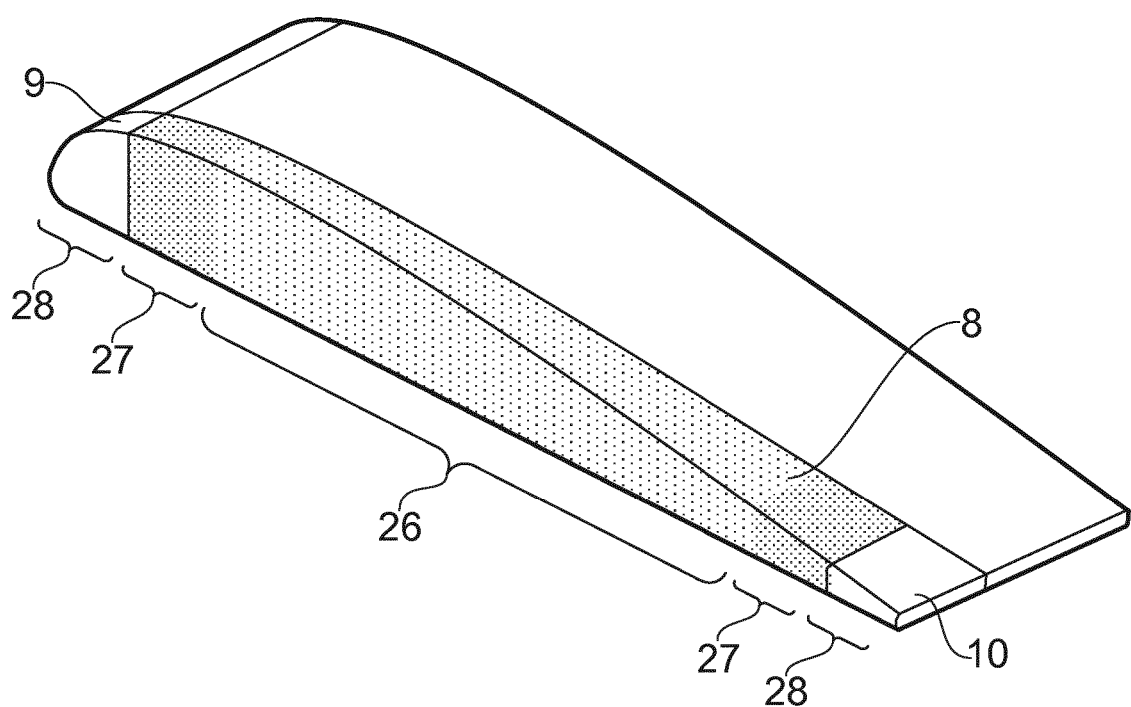
FIG. 9 shows an example lattice density distribution of the flap side edge module.

FIG. 9 corresponds generally to FIG. 2 and illustrates how the lattice density can be selectively modified across the module body 8.

As shown in FIG. 9 the leading and trailing edges 9 and 10 sit either end of the body 8 of the module. The dotted portions of the body illustrate the increasing density of the lattice. Specifically the body comprise a central portion 26 and two transitional portions 27 which are sandwiched between the ends of the body and the trailing/leading edges 9, 10. The trailing and leading portions are substantially solid section 28. The transition regions 27 exhibit a form generally similar to FIG. 8 and have an increasing lattice density as illustrated by the dotted regions in FIG. 9.

The exact lattice density gradient i.e. the rate of increase in density from region 26 to region 28 will depend on the predetermined lattice geometry, strength and or stiffness required.

Figure 10:
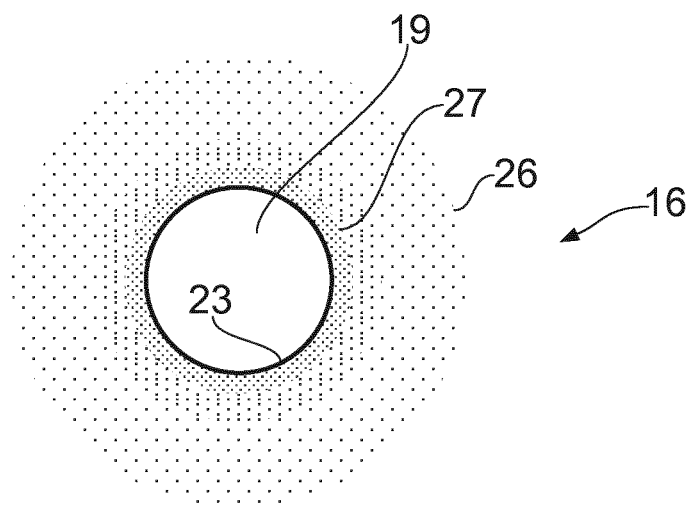
FIG. 10 shows an example lattice density distribution around a coupling.

A similar approach to the couplings may also be used as illustrated in FIG. 10 in combination with FIG. 5. As shown the shaft 23 is formed of a solid titanium portion. This is surrounded by a transition zone 27 where the lattice density decreases until it corresponds to the density of the body around the coupling.

Figure 11:
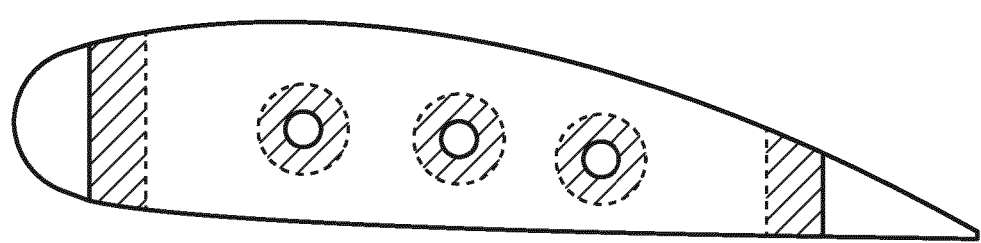
FIG. 11 shows example positions of transitional regions for a flap side edge module.

The inside of the body may be hollow as discussed above or alternatively could be filled with a low density lattice. As shown in FIG. 11 multiple transition zones may be provided around the coupling portions and between the body and leading/trailing edges.

In effect the lattice density is increased at appropriate portions of the body where additional strength and or stiffness is required, where a connection is required or where a coupling shaft has to be defined. Similarly the lattice density/porosity can be controlled according to the acoustic effects at the remained of the body.

A variety of additive manufacturing techniques could be used to form a structure described herein. For example, powder bed fusion, electron beam melting or laser melting powder bed additive manufacturing machines could be used. An example material could be titanium Ti64 having an example density of between 10 and 50 pores per inch and a density between 3% and 40%.

In one arrangement the module could be deposited directly onto the distance end of a flap, for example using additive manufacturing technique. Thus, a fully integrated since piece flap and noise attenuation module may be provided.

Alternatives

In other examples, the flap side edge module may not extend along the full length of the flap.

In still further examples, the flap side edge module may be incorporated on both the first flap side edge and the second flap side edge, defined above.

Depending on the specific part or area concerned, the pressure difference (footprint) may vary and therefore an optimal lattice density per specific pressure difference can be implemented for optimal acoustic performance.

Noise Attenuation Panel

The noise attenuation panel of the present disclosure may be configured for use in other situations. For example, the noise attenuation panel may be used in landing gear components. Furthermore, the noise attenuation panel may be used in non-aerospace applications, for example wind turbines In an aircraft application the structure may be applied to various parts of an aircraft, including but not limited to:
Engine cowlings
Winglets
Landing gear struts
Aerostructures
Spoilers
Aileron
Elevator
Transmitter housings The noise attenuation panel of the present disclosure comprises a porous mesh or lattice region and a transition region substantially as hereinbefore described. For example, the transition region has a mesh or lattice density gradient such that the mesh or lattice density varies from a coarse mesh or lattice at one end to a fine mesh or lattice at the other.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the present disclosure as defined by the claims or limitations on equivalents to the claims, and that other embodiments may be utilised and modifications may be made without departing from the spirit and scope of the claimed invention. Various embodiments of the present disclosure may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

The invention claimed is:

1. A flap side edge module for attachment to a wing flap, the module comprising:
a leading edge;
a trailing edge; and
a body portion located between the leading edge and the trailing edge, the body portion comprising a central portion and two transition regions, wherein the body portion is formed of a lattice structure wherein the central portion comprises a first lattice density throughout, wherein the body portion is connected to each of the leading edge and the trailing edge by a respective one of the two transition regions, wherein each transition region has a lattice structure density gradient such that a lattice density varies between a second lattice density adjacent to regions proximate to a leading edge or trailing edge and the first lattice density at a portion of the transition region adjacent to the central portion, wherein the first lattice density is lower than the second lattice density.

2. The flap side edge module of claim 1, wherein the leading edge and the trailing edge are formed of a solid material.

3. The flap side edge module of claim 1, wherein the lattice structure is formed of a non-uniform formation.

4. The flap side edge module of claim 1, wherein:
the lattice structure is formed of a titanium or titanium alloy,
the flap side edge module comprises at least one coupling configured in use to attach the module to an edge of a flap,
one of the at least one couplings is formed in the leading edge and/or the trailing edge and/or one of the at least one couplings is formed in the body portion, and
the at least one coupling comprises a shaft extending through the body portion and arranged to receive an attachment member extending through the body portion.

5. The flap side edge module of claim 4, wherein:
the at least one coupling comprises a shaft extending through the body portion and arranged to receive an attachment member extending through the body portion,
the shaft comprises a first layer and a second surrounding layer, wherein each of the first layer and the second layer extends around the perimeter of the shaft, and wherein the first layer has a higher lattice density than the second surrounding layer, and
the shaft further comprises a transition layer between the first layer and second surrounding layer, in which the lattice density reduces towards the surrounding second layer across the transition layer.

* * * * *